Figure 1:
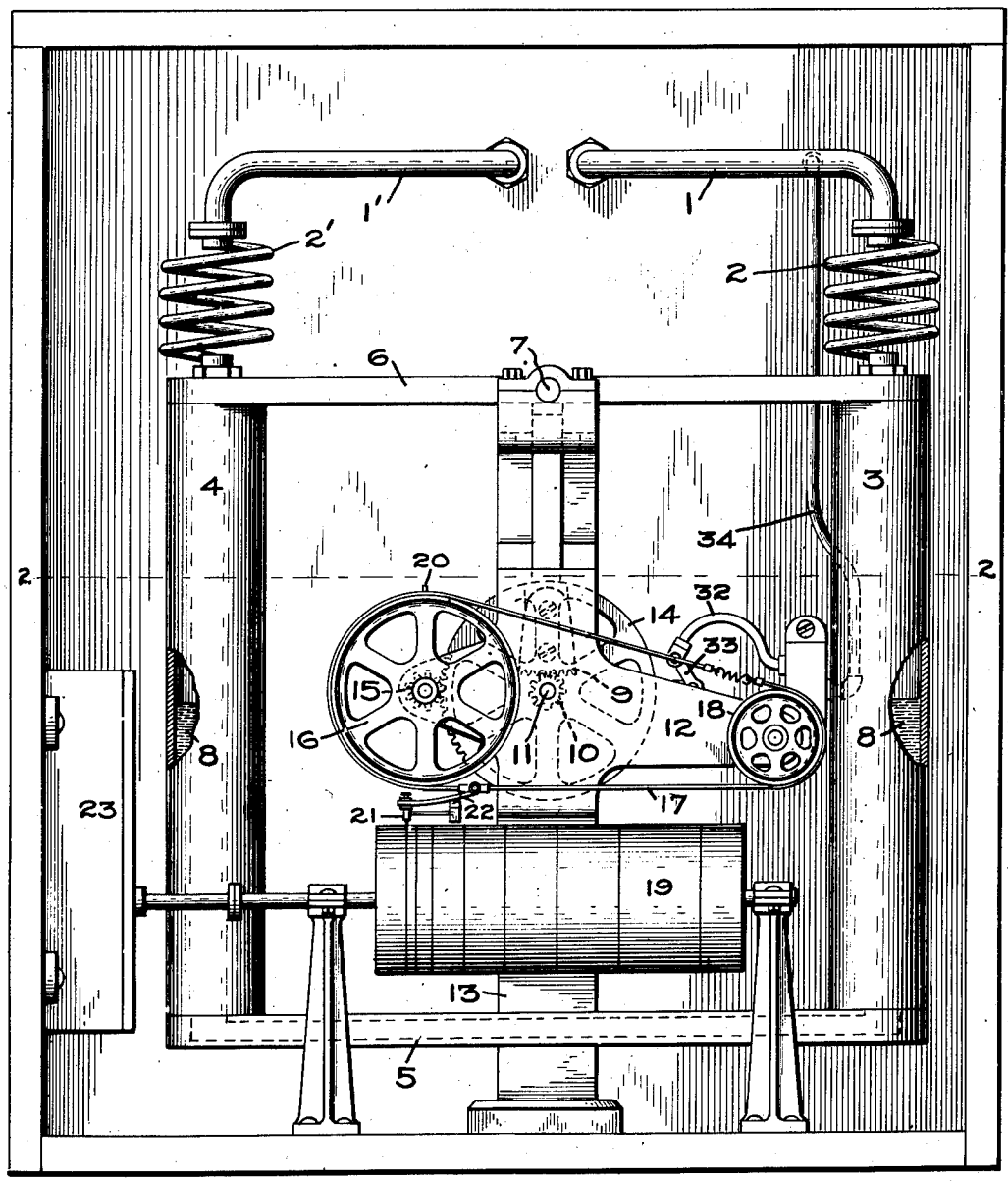

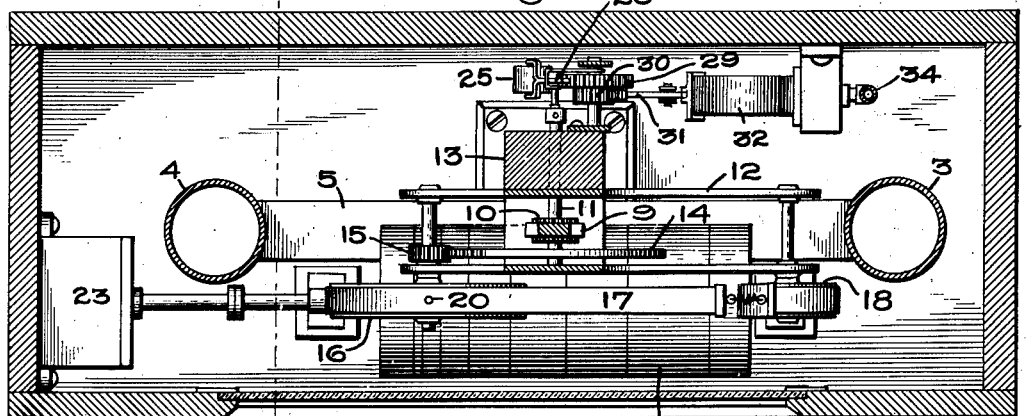
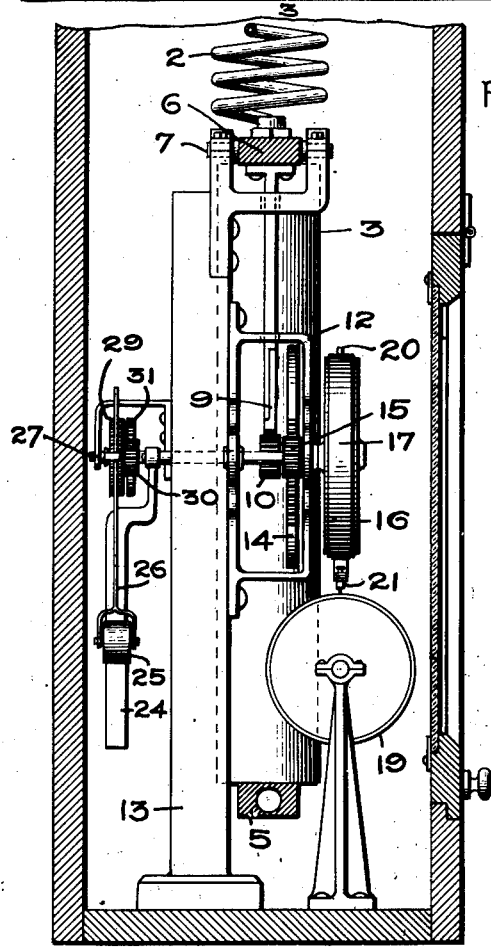
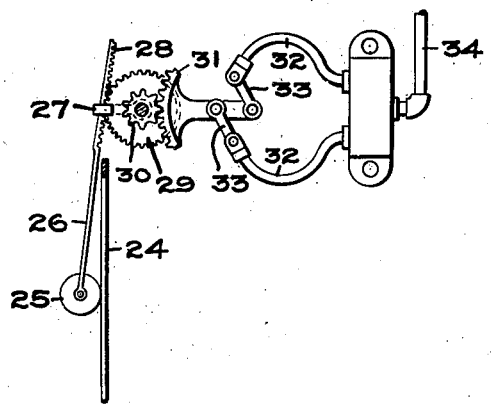

UNITED STATES PATENT OFFICE.

HAROLD H. MAPELSDEN, OF SCHENECTADY, NEW YORK, ASSIGNOR TO GENERAL ELECTRIC COMPANY, A CORPORATION OF NEW YORK.

FLUID-FLOW METER.

1,076,437.   Specification of Letters Patent.   Patented Oct. 21, 1913.

Application filed July 16, 1909. Serial No. 507,944.

*To all whom it may concern:*

Be it known that I, HAROLD H. MAPELSDEN, a citizen of the United States, residing at Schenectady, county of Schenectady, State of New York, have invented certain new and useful Improvements in Fluid-Flow Meters, of which the following is a specification.

This invention relates to that class of fluid flow meters in which a Pitot tube is employed in combination with a U-shaped mercury tube, the tube being mounted on pivots so that it can tilt and impart movement to suitable indicating or recording mechanism.

The present invention has especial reference to the mechanism by which the movements of the tilting tube are caused to actuate the devices that show or record the quantity of fluid flowing.

Stated briefly, the tube is geared to a movable band, preferably an endless belt, carrying the recording pencil or marker which moves transversely of the traveling record sheet. The gearing actuates a weight acting on an arm whose effective radius can be varied by a device responsive to the pressure of the fluid, so that the record will be correspondingly affected.

In the accompanying drawings, Figure 1 is a front elevation of my improved meter; Fig. 2 is a cross section on the line 2—2, Fig. 1; Fig. 3 is a vertical section on the line 3—3, Fig. 2, and Fig. 4 is a detail of the pressure compensating device.

The customary differential pressure devices in the fluid-conveying conduit are connected by the pipes 1, 1' and the flexible coiled tubes 2, 2' with the upper ends of the U-shaped tube, consisting preferably of two upright cups 3, 4 connected at their lower ends by a hollow bar 5. The cups 3, 4 are supported by a beam 6 which is mounted on suitable bearings 7 so that it will stand normally horizontal but is capable of oscillation in a vertical plane. The hollow bar and the cups contain a body of mercury 8, which fills said cups to a convenient height, say about halfway.

Attached to the beam 6 is a segment gear 9 concentric with the bearings 7, and meshing with a pinion 10 on a shaft 11 journaled in a frame 12 attached to the standard 18 or other framework of the apparatus. A spur gear 14 is secured to the shaft 11 and meshes with a pinion 15 on the shaft of a belt-pulley 16. A movable pencil-carrying band is attached to said pulley, preferably an endless belt 17 passing around an idler pulley 18, mounted on the frame 12, and so placed that the lower reach of the belt is parallel with the axis of a cylinder 19 on which the graduated record sheet is mounted. A pin 20 in the pulley 16 engages with said belt and prevents it from slipping. A pencil 21, fastened to the support 22 which is pivoted on the belt presses lightly on the record sheet. A clock 23 drives the cylinder 19 at an even rate of speed.

An arm 24 depends substantially vertically from the rear end of the shaft 11. Resting against it is a weight 25, on the end of a rod 26 passing up through a stationary guide 27, in line with the axis of the shaft 11, and provided with rack teeth 28 meshing with a gear wheel 29. A pinion 30 on the shaft of said gear wheel meshes with a sector gear 31 which is adapted to be turned by a pressure-responsive device, preferably two oppositely-acting Bourdon tubes 32 whose free ends are connected by links 33 to points on opposite sides of the center of said sector gear, and whose fixed ends communicate by a pipe 34 with the pipe 1 leading from the high pressure Pitot tube in the fluid conduit.

The operation is as follows: The rapidly flowing fluid in the conduit sets up a differential pressure in the pipes 1, 1', that in the former being the greater, so that a portion of the mercury 8 in the cup 3 is driven over into the cup 4. This causes the beam to tilt downward to the left, and the segment gear 9 rotates the pulley 16 by means of the pinions 10, 15 and the spur gear 14; the movement of the segment gear being greatly multiplied, preferably in the ratio of 1 to 72. A small fluctuation in flow will therefore cause a considerable travel of the belt 17 and the pencil 21. The record sheet is of such width as to take a wide variation of flow, and the pulley 16 is preferably of such a diameter that a half revolution will carry the pencil from one side of the sheet to the other. When the segment gear 9 rotates the shaft 11, it thereby imparts angular movement to the arm 24. This movement tends to swing the weight 25 upward, and the turning moment required to effect this result depends upon the angular departure of the arm 24 from the vertical, and also upon the distance of the weight from the axis of the shaft 11; the shorter the distance, the less being the energy required. Now an increase in the static pressure of the fluid whose flow is being metered will, if said fluid is elastic, increase the mass of the fluid passing in a given time at a predetermined constant velocity. In order, therefore, to obtain an accurate record, the variations in pressure must be provided for. This is accomplished in the present instance by the Bourdon tubes 32, which upon an increase in the static pressure in the pipe 1 tend to straighten out, and thus turn the sector gear 31, thereby rotating the gear wheel 29 and lifting the weight 25 so that the effective length of the arm 24 is shortened and its turning moment is enabled to carry the weight through a greater angular travel. The pencil therefore moves farther across the sheet to a position indicating the increased weight of steam flowing in the conduit.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States is,

1. A fluid flow meter having a substantially U-shaped mercury tube, a pivot on which the tube is mounted to tilt, mechanism for showing the quantity of fluid flowing, gearing between the pivot and said mechanism, and means responsive to changes in the static pressure of the fluid being metered that coöperates with said gearing to modify the action of said mechanism to compensate for static pressure changes.

2. A fluid flow meter having a substantially U-shaped mercury tube mounted to tilt, a pivot for the tube, a segment gear that moves with the tube about the pivot, a shaft driven by the gear, a recording mechanism, gearing between the shaft and said mechanism, and means responsive to changes in the static pressure of the fluid being metered that coöperates with the gearing to modify the action of the recording mechanism to compensate for static pressure changes.

3. A fluid flow meter having a tilting beam, mercury cups carried on the ends of the beam, a conduit connecting the cups, means for subjecting them to differential pressures created by the flowing fluid, a recording mechanism, gearing arranged in the space between the cups that is actuated by the beam and in turn actuates said mechanism, and means responsive to changes in the static pressure of the fluid being metered that coöperates with the gearing to modify the action of the recording mechanism to compensate for static pressure changes.

4. A fluid flow meter having a tilting beam, mercury cups carried on said beam, means for connecting said cups, means for subjecting them to differential pressures created by the flowing fluid, mechanism for recording the movements of said beam, means for transmitting motion from the beam to said mechanism, an arm angularly moved by said beam, a weight engaged by said arm, and a pressure-responsive device acting to vary the point of contact of said weight along said arm.

5. A fluid flow meter having a tilting mercury tube, gearing actuated by said tube, recording mechanism actuated by said gearing, a normally vertical arm rotatable by said gearing, a weight hanging adjacent to said arm, a pressure responsive device, and means actuated thereby for varying the radial distance of said weight from the axis of rotation of said arm.

6. A fluid flow meter having a tilting beam, mercury cups carried thereon, means for connecting said cups, a segment gear on said beam, a shaft driven by said gear, recording mechanism geared to said shaft, a normally vertical arm on said shaft, a rod passing through the axis of said shaft, a weight on said rod bearing against said arm, and a motor device actuated by the pressure of the fluid and operating to raise and lower said rod.

7. A fluid flow meter having a normally horizontal beam, mercury cups depending from the ends of the beam, conduit means connecting the lower portions of the cups, a pivot for the beam arranged between its ends, means for subjecting the mercury in the cups to differential pressures created by the flowing fluid, a segment gear extending downward from the pivot into the space between the cups, a shaft parallel to the pivot, a pinion on the shaft that meshes with the segment gear, and mechanism for showing the quantity of fluid flowing that is driven from the pinion.

8. A fluid flow meter having a normally horizontal beam, mercury cups depending from the ends of the beam, conduit means connecting the lower portions of the cups, a pivot for the beam arranged between its ends, means for subjecting the mercury in the cups to differential pressures created by the flowing fluid, a segment gear extending downward from the pivot into the space between the cups, a shaft parallel to the pivot, a pinion on the shaft that meshes with the segment gear, an arm on the shaft, a weight acting on the arm, a device responsive to the pressure of the fluid that moves the weight along the arm as the pressure varies, and a recording mechanism driven from the pinion.

9. A fluid flow meter having a normally horizontal beam, mercury cups depending from the ends of the beam, conduit means connecting the lower portions of the cups, a pivot for the beam arranged between its ends, means for subjecting the mercury in the cups to differential pressures created by the flowing fluid, a segment gear extending downward from the pivot into the space between the cups, a shaft parallel to the pivot, a gear on the shaft that meshes with the segment gear, and a recording mechanism driven from said gear and comprising a belt, pulleys around which the belt passes, and a marker carried by the belt.

In witness whereof, I have hereunto set my hand this 15th day of July 1909.

HAROLD H. MAPELSDEN.

Witnesses:
HELEN ORFORD,
HOWARD M. MORSE.